United States Patent [19]

Johnson

[11] Patent Number: 4,574,826

[45] Date of Patent: Mar. 11, 1986

[54] ADJUSTABLE VACUUM BREAKER FILL VALVE

[75] Inventor: Dwight N. Johnson, Vista, Calif.

[73] Assignee: Masco Corporation, Taylor, Mich.

[21] Appl. No.: 536,778

[22] Filed: Sep. 28, 1983

[51] Int. Cl.⁴ .............................................. F16K 31/34
[52] U.S. Cl. ...................................... 137/2; 137/218; 137/403; 137/414; 137/426; 137/436; 251/46; 251/127
[58] Field of Search ............... 137/218, 436, 437, 414, 137/403, 2, 426; 251/127, 46

[56] References Cited

U.S. PATENT DOCUMENTS

| | | | |
|---|---|---|---|
| 2,442,927 | 6/1948 | Horvath | 137/403 |
| 2,685,301 | 8/1954 | Dreier | 137/403 |
| 2,986,155 | 5/1961 | Doyle | 137/218 |
| 3,242,940 | 3/1966 | Sirotek | 137/218 |
| 3,895,645 | 7/1975 | Johnson | 137/414 |
| 4,065,095 | 12/1977 | Johnson | 137/414 |
| 4,180,096 | 12/1979 | Johnson | 137/414 |
| 4,338,964 | 7/1982 | Schoepe | 137/436 |

*Primary Examiner*—G. L. Walton
*Attorney, Agent, or Firm*—Mason, Kolehmainen, Rathburn & Wyss

[57] ABSTRACT

A fill valve for controlling liquid level in a toilet water tank or other tank includes a valve head assembly positioned at a selected level in the tank by a telescoping riser assembly with liquid inlet and outlet conduits extending toward the tank bottom. An adjusting nut on a stationary riser engages thread structures on inlet and outlet conduits for raising or lowering the valve head assembly and adjusting the liquid level. A main valve in the head assembly is controlled by a non-horizontal diaphragm separating a vent chamber and a control chamber. The control chamber is pressurized as liquid rises to the selected level by a standpipe extending downwardly in the tank. The valve closing and opening levels are offset by partly filling the vent chamber with liquid when the main valve is open to hydraulically load the diaphragm. A vacuum breaker valve obstructs backflow through the valve, vents the flow path when the valve is closed, and regulates flow into the vent chamber when the valve is open.

13 Claims, 13 Drawing Figures

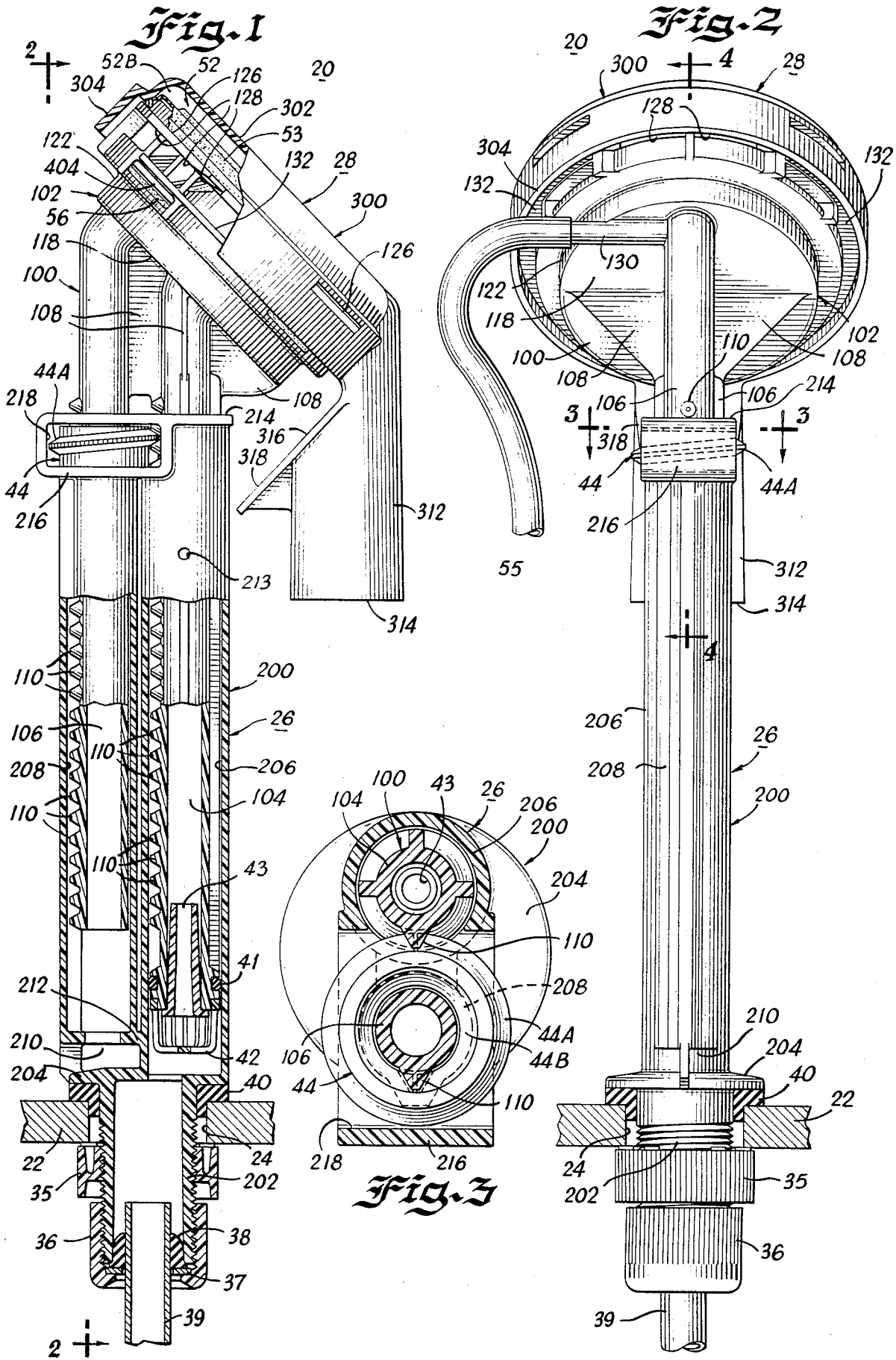

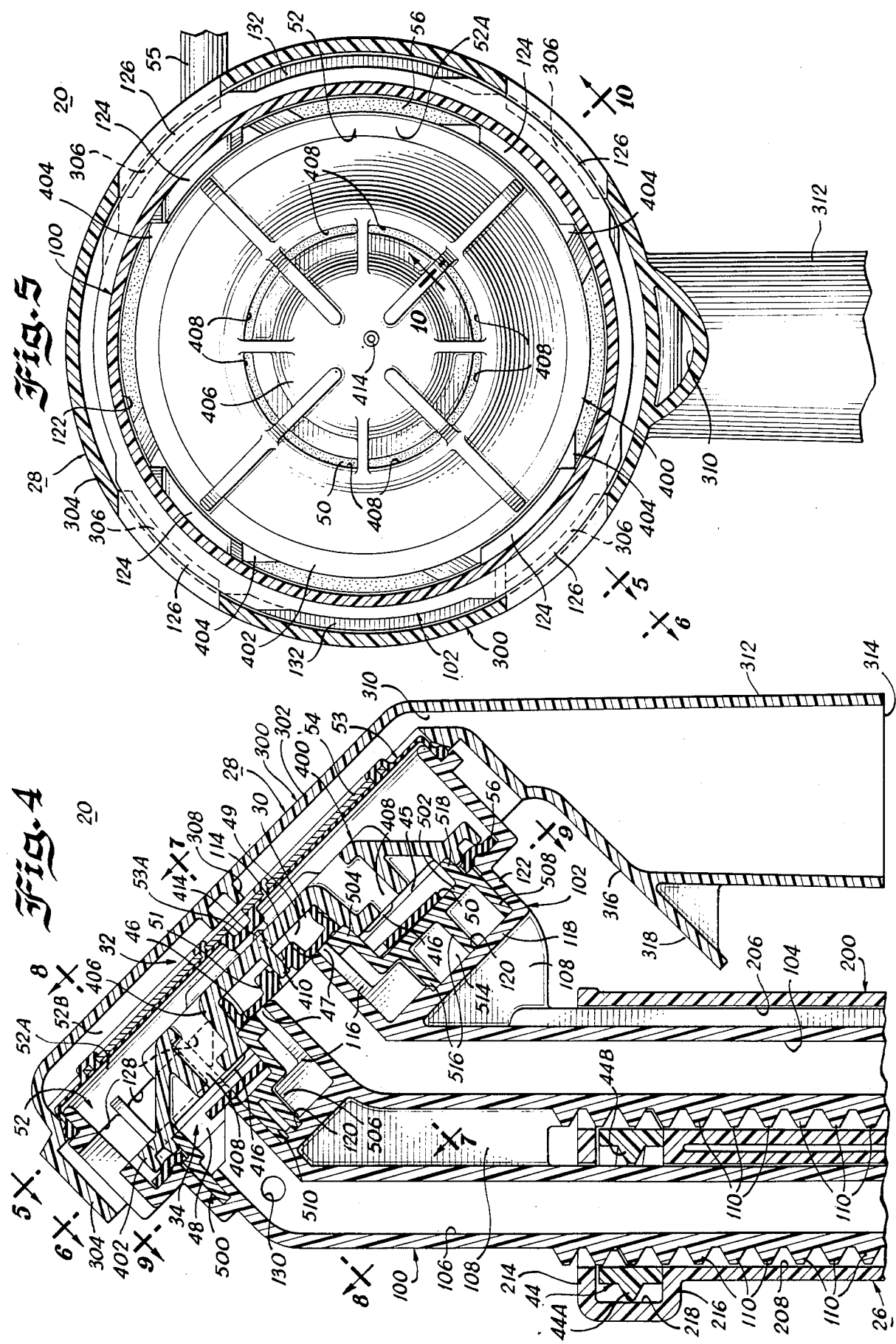

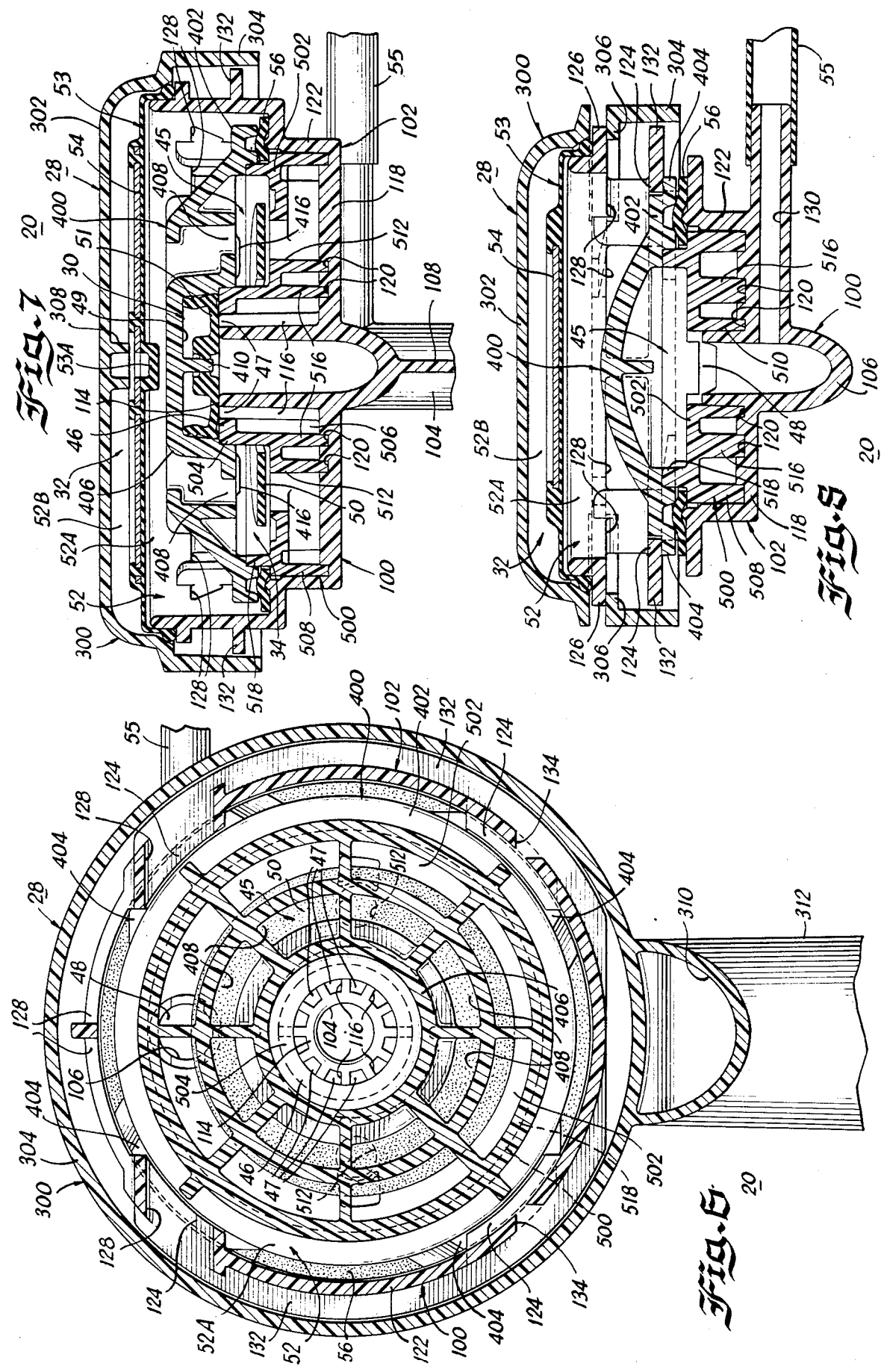

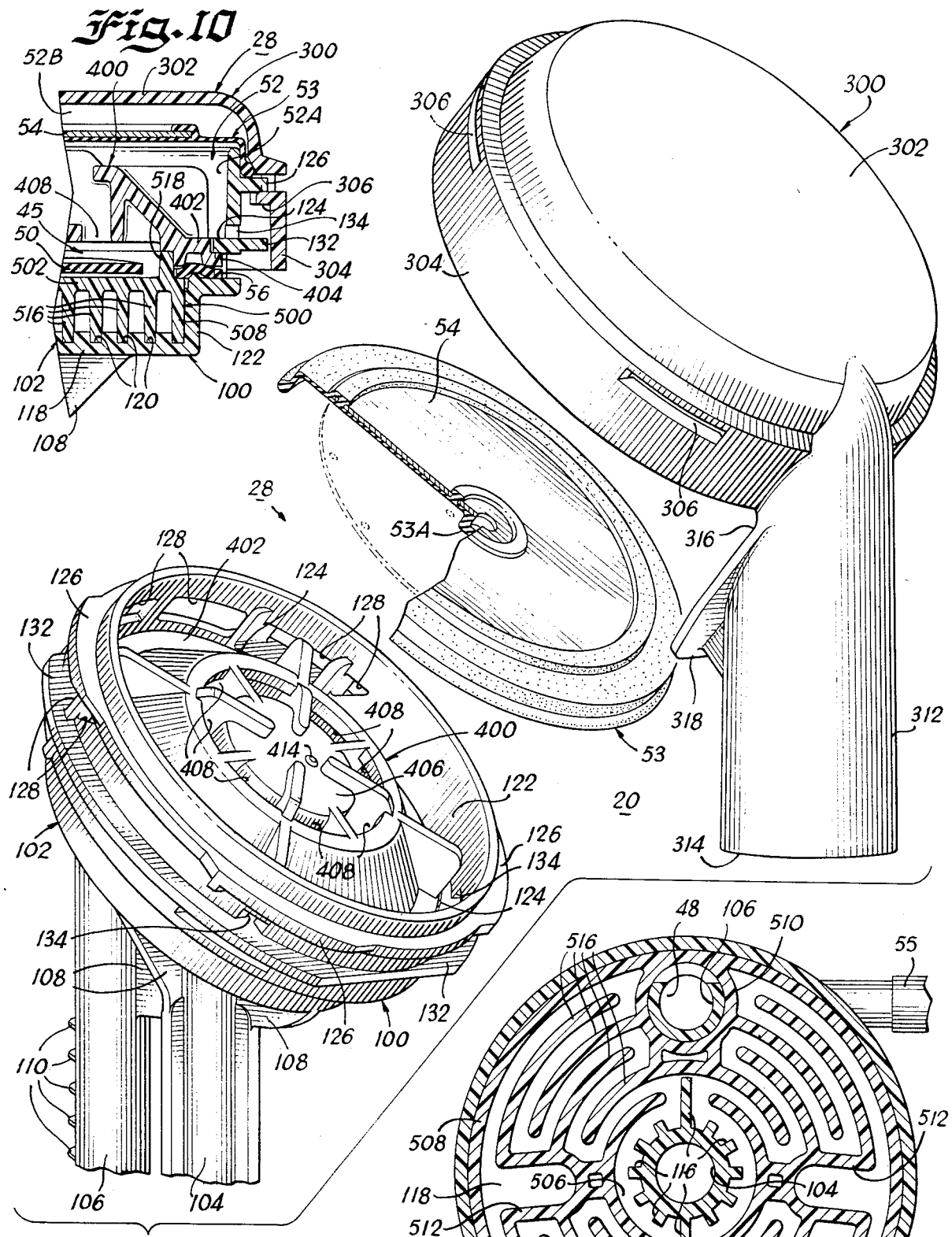

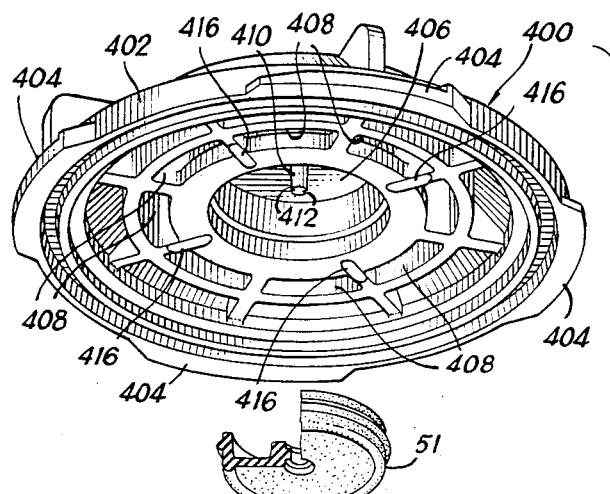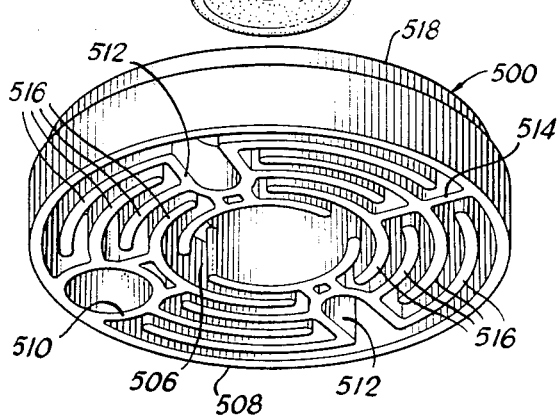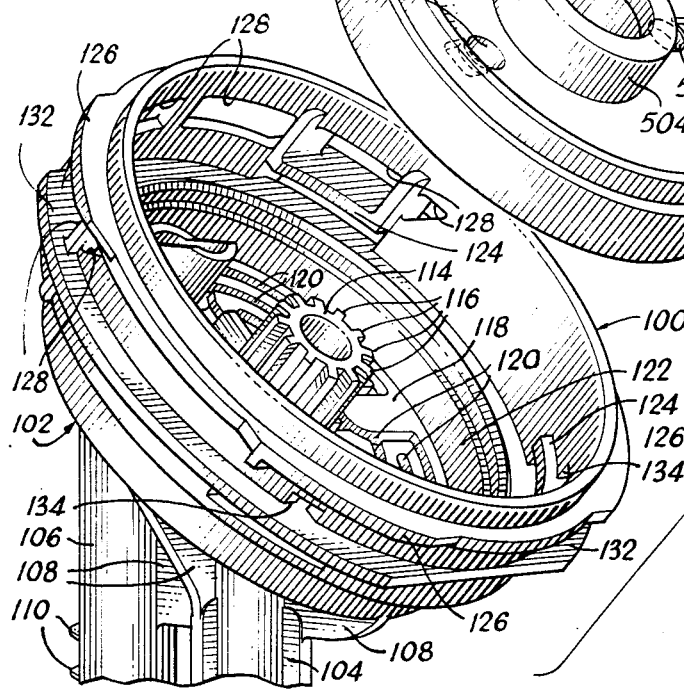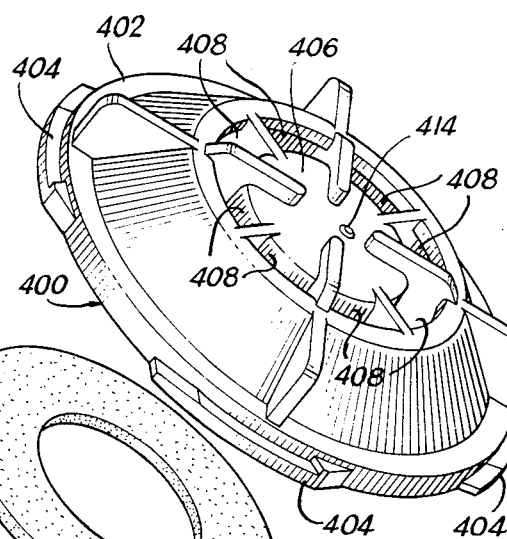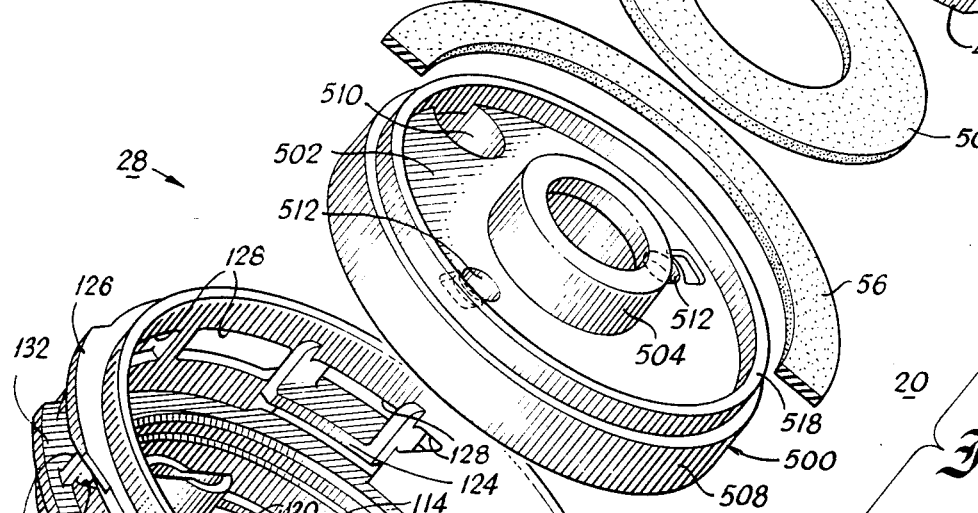

ADJUSTABLE VACUUM BREAKER FILL VALVE

The present invention relates to a fill valve for water level control in toilet tanks and similar tanks.

Fill valves function to maintain a predetermined liquid level in a tank or reservoir, and are used widely in toilet tanks and other tanks. A typical fill valve includes an inlet adapted to be connected to a supply of pressurized liquid, an outlet communicating with the tank, a valve for controlling flow into the tank, a device for detecting the level of liquid in the tank and structure for opening the valve when the detected liquid level is below the predetermined level. In the past, many fill valves have been of the ball cock variety wherein the valve is controlled by a float. My U.S. Pat. Nos. 3,895,645 and 4,180,096 disclose fill valves having advantages over ball cocks, including compactness and cost. Those fill valves are entirely submerged and use diaphragms responsive to liquid pressure to detect liquid level.

While the devices disclosed in my prior patents have been successful in achieving their intended purposes, it may be desirable in some instances that the fill valve not be entirely submerged to the end that an atmospheric vacuum breaker can be included in the liquid flow path. Accordingly, one object of the present invention is to provide an improved fill valve of the type in which the valve or a portion thereof is mounted in a tank above the liquid level and wherein vacuum breaker capability is provided.

One difficulty which has been encountered with ball cocks and other fill valves extending above the water level results from the wide variety of tank configurations in which such valves may be used. Variations in tank height make it desirable that the height of the fill valve, as well as the water level, be adjustable so that the fill valve has universal application in different tanks. Another object of the present invention is to provide a fill valve which is reliably and easily adjustable to accommodate tanks of various depths.

The fill valves disclosed in my patents referred to above make use of a highly reliable and efficient valve system including a main valve and a pilot valve controlled by a diaphragm serving to detect water level in the tank. It is desirable to incorporate this valve system in a non submerged fill valve. Accordingly, it is yet another object of the invention to provide a fill valve including an improved structure including a downwardly extending standpipe for controlling a pressure responsive diaphragm in accordance with liquid level in a tank.

It is desirable in the operation of a fill valve that the opening and closing of the valve be effected positively in order to avoid any tendency to "hunt" or operate in a partly open condition. A further object of the present invention is to provide a fill valve wherein stable operation is achieved because the opening and closing water levels are offset from one another.

Among the other important objects of the present invention are to provide a fill valve overcoming disadvantages of fill valves used in the past; to provide a fill valve which is safe and easy to use, is quiet in operation, and which is simple and reliable.

In brief, the objects and advantages of the present invention including those referred to above are achieved through the provision of a fill valve including a valve head assembly positioned at a selected elevation in the tank above the predetermined water level by a telescoping riser assembly. The riser assembly includes a riser having a shank portion fixed to a wall of the tank and including inlet and outlet sections. Inlet and outlet flow conduits extend downwardly from the valve head assembly and are telescopically adjustable with respect to the inlet and outlet sections of the riser. An adjusting nut associated with the riser threadedly engages the inlet and outlet conduits for adjustment of the height of the valve assembly in the tank and simultaneous adjustment of the predetermined liquid level.

A main valve in the valve head assembly opens and closes communication between the inlet and outlet conduits under the control of a diaphragm separating a vent chamber and a control chamber. A vacuum breaker chamber is disposed in an outlet flow path extending from the main valve to the tank interior. The vacuum breaker chamber includes first port means communicating with the main valve, second port means communicating with the vent chamber and third port means communicating downstream along the outlet flow path. A vacuum breaker valve in the form of a simple, washer-like, elastomeric member overlies the first port means when the main valve is closed and the second port means when the main valve is open.

A standpipe communicating with the control chamber extends downwardly in the tank and applies pressure to the diaphragm in response to increasing liquid level. The diaphragm is non-horizontal, and when the main valve is open, the vent chamber is partly filled with liquid in order to hydraulically load the diaphragm with the result that the liquid level required to close the main valve is increased. The vent chamber is drained when the main valve is closed so that a lower liquid level results in reopening of the main valve.

The above and other objects and advantages of the invention may be best understood from the following detailed description of the embodiment of the present invention illustrated in the drawings, wherein:

FIG. 1 is a side elevational view, with portions broken away, of a fill valve constructed in accordance with the invention;

FIG. 2 is another side elevational view of the fill valve, taken from the line 2—2 of FIG. 1;

FIG. 3 is a sectional view on an enlarged scale taken along the line 3—3 of FIG. 2 and illustrating portions of the riser assembly of the fill valve;

FIG. 4 is a sectional view of the head assembly and part of the riser assembly of the fill valve, taken along the line 4—4 of FIG. 2;

FIG. 5 is a sectional view taken along the line 5—5 of FIG. 4;

FIG. 6 is a sectional view taken along the line 6—6 of FIG. 4;

FIG. 7 is a sectional view taken along the line 7—7 of FIG. 4;

FIG. 8 is a sectional view taken along the line 8—8 of FIG. 4;

FIG. 9 is a sectional view taken along the line 9—9 of FIG. 4;

FIG. 10 is a fragmentary sectional view taken along the line 10—10 of FIG. 5;

FIG. 11 is an exploded perspective view, partly in section, of the diffuser, main valve member and cap prior to assembly;

FIG. 12 is an exploded perspective view, partly in section, of the body, diffuser, seal, vacuum breaker valve member and cap prior to assembly; and FIG. 13 is an exploded perspective view, partly in section, showing the body of the fill valve with other components assembled therewith and of the diaphragm assembly and cover prior to assembly.

Having reference now to the drawings, there is illustrated a fill valve constructed in accordance with the principles of the present invention and designated as a whole by the reference numeral 20. Fill valve 20 is mounted to a wall 22 of a tank such as a toilet water tank, and functions to maintain the level of liquid within the tank at a preselected level. Although the fill valve 20 is intended to be mounted as illustrated in an aperture 24 in the bottom wall 22 of the tank, principles of the invention are applicable also to tanks having other types of inlet arrangements such as a sidewall inlet.

In general, the fill valve 20 includes a riser assembly generally designated as 26 (FIGS. 1-4) by means of which a valve head assembly generally designated as 28 can be raised or lowered to accommodate tanks of different heights. The valve head assembly includes a main or control valve assembly generally designated as 30 (FIG. 4) controlled by a water level responsive pressure detecting system generally designated as 32 (FIG. 4) for admitting water to the tank when the water level falls below a selected level. A vacuum breaker valve assembly generally designated as 34 (FIG. 4) resists backflow through the fill valve 20, provides an atmospheric vacuum breaker, and contributes as described below to operation of the fill valve 20 in a positive on and off manner.

The main components of the fill valve 20 are preferably formed of molded plastic material and are readily assembled together without separate fasteners or the like to define the various operating sections of the head assembly 28. These main components include a body 100 adjustably related to a riser 200, and a cover 300, cap 400 and diffuser 500 assembled with the upper portion of body 100 to form the head assembly 28. To assist in interrelating the accompanying drawings with this written description, elements of the valve components 100, 200, 300, 400 and 500 respectively are designated by three digit reference numerals beginning with the same digit 1, 2, 3, 4 or 5.

Riser 200 (FIGS. 1-4) includes a shank portion 202 extending through the tank wall aperture 24. The shank is threaded to receive a mounting nut 35 for supporting the riser 200 and a coupling nut 36 cooperating with a thrust washer 37 and seal 38 to connect the riser shank 202 to a conduit 39 supplying water or other liquid under pressure to the fill valve 20. A gasket 40 held in compression by a lower flange 204 of riser 200 seals the aperture 24 in the tank wall 22.

Within the tank, the riser 200 includes a generally circular cylindrical inlet section 206 and outlet section 208 extending generally parallel with one another. The inlet section communicates with supply conduit 39 by way of shank 202, and the outlet section 208 communicates with the interior of the tank by way of an outlet port 210 adjacent the base flange 204 at the lowermost portion of the outlet section 208.

Inlet and outlet sections 206 and 208 are elongated tubular structures extending parallel to one another upwardly from the tank bottom. They are joined together at the bottom by a web portion 212 and at the top by an upper flange 214. Upper flange 214 merges with a generally U-shaped wall 216 to define a generally rectangular opening or window 218 at the top of the outlet section 208. The opening 218 is accessible from both sides of the riser 200 and also is open to the upper portion of the inlet section 206 (see FIGS. 1 and 4).

The body 100 includes an upper head portion 102 generally of an open-topped, cup shape (FIG. 12). Descending from head portion 102 are an inlet conduit 104 and an outlet conduit 106 which, along with riser 200, constitute the riser assembly 26. Conduits 104 and 106 extend parallel to one another and are stiffened with respect to one another and with respect to head portion 102 by a number of webs 108. In the illustrated embodiment of the invention, the inlet and outlet conduits 104 and 106 are intended to be vertical, and the head portion 102 is inclined at an angle of 45°. The non-horizontal orientation of the head assembly 28 and of the head portion 102 provides an important function in the operation of the fill valve 20 as discussed in more detail below.

Inlet and outlet conduits 104 and 106 are telescoped within the inlet and outlet sections 206 and 208 of the riser. An O-ring 41 seals the exterior of the inlet conduit 104 against the interior of the inlet section 206. A strainer 42 and flow restrictor 43 are mounted at the end of the inlet conduit 104. When the main valve assembly 30 of the fill valve 20 is open, liquid flows from the supply conduit 39 into the inlet section 206 and then into the inlet conduit 104 toward the head assembly 28. From the head assembly 28, liquid flows through the outlet conduit 106 into the outlet section 208 and into the tank through the outlet port 210.

Fill valve 20 may be installed in tanks of various heights, and in accordance with the invention the height of the fill valve is readily adjustable. Riser assembly 26 includes not only the riser 200 and parts of body 100, but also an adjustment nut 44 located within the opening 218 of the riser 200. Both the inlet conduit 104 and the outlet conduit 106 include thread structure in the form of teeth 110 extending a substantial distance along their length. The teeth 110 form rack gear structures threadedly engaged by an external thread 44A and an internal thread 44B of the adjustment nut 44, the threads 44A and 44B each including slightly less than 1 complete convolution.

The body 100 is illustrated in FIGS. 1, 2 and 4 in substantially its lowermost position with respect to riser 200. In order to adjust the height of the fill valve 20, nut 44 is grasped at the open sides of opening 218 and rotated. Engagement of threads 44A and 44B with teeth 110 causes the body 100 to be raised or lowered with respect to the riser 200 to the desired height. Due to the mechanical advantage of the threads and teeth and to the friction provided by O-ring 41, the body 100 will remain in any position to which it is adjusted.

The height of the body 100 may be adjusted while the fill valve 20 is subjected to liquid pressure. If the body 100 is raised to an extreme upper position, the O-ring 41 moves past a pressure relief port 213 and inlet liquid is bypassed directly to the interior of the tank. This prevents inlet pressure from forcefully ejecting the body 100 from the riser 200 in the event that the body 100 is raised too far.

Adjustment of the relative positions of body 100 and riser 200 varies the overall height of the fill valve 20 and determines the elevation of the head assembly 28 above the tank wall 22. The water level maintained by the fill valve 20 within the tank is determined with respect to the position of the head assembly 28, so that adjustment of the height of the head assembly 28 also adjusts the water level.

In addition to the head portion 102 of body 100, the head assembly 28 of the fill valve 20 includes the cover 300, the cap 400 and the diffuser 500. As seen in FIG. 4, when the fill valve 20 is assembled, the diffuser 500 is captured within the cup shaped head portion 102 of the body 100 by the cap 400. The main valve assembly 30 and the vacuum breaker valve assembly 34 are located beneath the cap 400 and above the diffuser 500. The cover 300 is attached over the open top of the body head portion 102 and cooperates with the body head portion 102 and cap 400 to provide a diaphragm cavity 52 of the pressure detecting system 32.

Diffuser 500 nests within the head portion 102 and provides a path for the flow of liquid from the main valve assembly 30 to the vacuum breaker valve assembly 34. An annular top wall 502 defines the bottom of a vacuum breaker chamber 45. A central hub-like element 504 extends above top wall 502 and defines the peripheral, outermost portion of a valving surface 46 of the main valve assembly 30. Body 100 includes a circular valve seat 114 in head portion 102 defined by the upward end of inlet conduit 104. Seat 114 is surrounded by a plurality of radially outwardly directed walls 116 defining therebetween a number of main valve ports 47. Seat 114 and walls 116 are received within the central hub 504 of the diffuser 500, and the ports 47 are disposed in the valving surface 46 and have increasing widths in the radially outward direction.

Liquid flowing from the main valve assembly 30 through the main valve ports 47 reaches a radially inward region 506 of the diffuser 500 disposed below the top wall 502 (FIGS. 4 and 9). The diffuser includes a continuous outer skirt or wall 508, and the annular region between the inward portion 506 and the outer wall 508 is generally divided into quadrants by four different wall structures 510, 512, 514 and 516. As will appear in more detail, wall structure 510 accommodates an outlet port 48 from the vacuum breaker valve assembly 34. Wall structures 512 define a pair of diffuser outlet flow ports. Wall structure 514 is a dividing wall between two quadrants of the diffuser flow path.

In order to dissipate flow velocity and attenuate liquid pressures in the fill valve 20, the diffuser includes a plurality of baffle walls 516 in each of the four flow path quadrants. The baffle walls 516 are alternately interleafed in opposite directions to define flow path segments having numerous substantially right angle turns, each of which results in loss of energy in flowing liquid. The effect of the repeated right angle turns is to regulate the flow velocity through the fill valve 20 to a desired value while dissipating inlet pressure. Other abrupt changes of direction of liquid flowing through the fill valve 20, for example at the valving surface 46, the diffuser outlet ports 512, and the outlet port 48 have a similar effect. The flow restrictor 43 is included to help regulate the overall flow characteristics of the fill valve 20.

In order to position and support the diffuser 500, the head portion 102 of body 100 includes a base wall 118 having an upwardly directed array of recesses 120 (FIGS. 4, 7, 8, 10 and 12). When the diffuser 500 is nested in the body 100, the outer wall 508, the wall structures 510, 512 and 514 and the baffle walls 516 are received in body recesses 120 so that the portions of the diffuser are well supported and so that liquid flow is not bypassed beneath the diffuser. Body head portion 102 includes a circular side wall 122 extending upwardly from base wall 118 within which the diffuser outer wall 508 is snuggly and slideably received.

Cap 400 holds the diffuser 500 in place in the body 100 and is attached to the body 100 with a bayonnet lock structure. A seal 56 is captured between the body 100 and cap 400. The cap includes an annular outer wall 402 from which a number of bayonnet projections 404 radially extend. The body 100 includes a similar number of bayonnet latch ledges 124. To mount the cap in the body, the cap is inserted within the circular sidewall 122 with the projections 404 displaced from the ledges 124. The cap is then rotated to the interlocked position shown in the drawings (see FIG. 6) with cam surfaces on the projections 404 facilitating this action and with stop surfaces on projections 404 engaging the ends of ledges 124 in the fully assembled position.

As appears in FIGS. 4 and 7, the cap 400 holds the diffuser 500 firmly in place in body 100. Annular wall 402 includes a portion engaging a circular upstanding wall 518 on the diffuser (see also FIG. 12). In addition, cap 400 includes a central, hub-like portion 406 engaging the outer periphery of the central hub 504 of the diffuser 500.

The underside of cap 400 cooperates with diffuser 500 in defining the vacuum breaker chamber 45. In addition, the central hub 406 of the cap defines a chamber 49 above the valving surface 46 for the main valve assembly 30. When the cap 400 and diffuser 500 are assembled with body 100, a vacuum breaker valve member 50 is captured in the vacuum breaker chamber 45 and a main valve member 51 is captured in the main valve chamber 49.

Vacuum breaker valve member 50 preferably is a simple washer-like body of rubber or other elastomeric material captured freely and loosely within the vacuum breaker chamber 45. Valve member 50 cooperates with the diffuser outlet ports 512 to obstruct possible back flow through the fill valve 20 and also cooperates with a circular array of vent ports 408 in the cap 400 to vent the vacuum breaker chamber 45 to atmosphere when the fill valve 20 is closed.

The main valve member 51 is firmly captured at its periphery between the hub portions 406 and 504 of the cap 400 and diffuser 500. The central portion of the main valve member 51 includes an opening slideably movable about a projection 410 extending downwardly from the cap hub portion 406. Projection 410 includes notches 412 (FIG. 11) providing a restricted flow path from the inlet conduit 104 to main valve chamber 49.

Cover 300 is also attached to the body head portion 102 by a bayonnet latch arrangement. The cover includes a top wall 302 with a depending skirt wall 304 fitting around the circular side wall 122 of the body 100. The bayonnet latch projections 126 extend radially outwardly from the sidewall 122 of the body 100 and engage latch ledges 306 extending radially inward from the skirt wall 304 of the cover. To mount the cover 300 on the body 100, the cover is placed over the body head portion 102 with the projections 126 spaced from the ledges 306. The cover is rotated to effect the bayonnet latch. Cam surfaces on the latch projections 126 assist in effecting the latch and stop surfaces define the fully assembled position.

Pressure detecting system 32 includes a diaphragm cavity 52 defined above the cap 400 and within the cover 300. This chamber is subdivided into a lower vent chamber 52A and an upper control chamber 52B by means of a diaphragm 53 held between the cover 300 and body 100. The diaphragm 53 includes a beaded periphery sealingly clamped between the cover and body. The diaphragm 53 is formed of a suitable flexible and resilient material such as rubber, and a stiffening disc 54 is molded together with the diaphragm 53 as by filling an array of small holes in the disc 54 with the material of the diaphragm 53 as illustrated (FIGS. 4 and 13).

A projection 308 extends downwardly from a cover top wall 302 and limits upward movement of the diaphragm 53 in order to prevent undesirable stress on the diaphragm. A pilot valve portion 53A of the diaphragm cooperates with a pilot valve seat 414 of cap 400 extending from the vent chamber 52A to the main valve chamber 49 by means of a small passage extending through the central hub portion 406 of the cap 400.

The lower vent chamber 52A of the diaphragm cavity 52 is freely vented to the interior of the tank above water level by means of vent ports 128 formed in the circular sidewall 122 of body 100. Clearance between the skirt wall 304 of the cover and the sidewall 122 of the body assures unrestricted venting of the chamber 52A.

The upper control chamber 52B of the diaphragm cavity 52 communicates by means of a passage 310 with the interior of a downwardly extending standpipe portion 312 of the cover 300. When liquid level rises above the bottom end 314 of the standpipe, air trapped within the control chamber 52B increases in pressure and applies a force to the diaphragm 53 tending to close the pilot valve portion 53A against the pilot valve seat 414.

Operation of the fill valve 20 will now be described. The fill valve is installed in a liquid containing tank with the supply conduit 39 interconnected with a source of pressurized liquid. The elevation of the head assembly 28 is adjusted by operation of the adjustment nut 44 as described above to accommodate the height of and to select the liquid level to be maintained in the tank. The interior of the inlet conduit 104 below the main valve member 51 is continuously and directly communicated with pressurized liquid. The fill valve 20 functions to maintain a predetermined water level, and to refill the tank when the water level falls.

When water level within the tank is at the predetermined level, the main valve member 51 is closed against the main valve seat 114 and liquid is prevented from flowing through the main valve ports 47. Restricted communication along the notches 412 in projection 410 pressurize the main valve chamber 49 because trapped and pressurized air within the control chamber 52B operates diaphragm 53 to close the pilot valve seat 414. The main valve member 51 is positively clamped shut because the pressurized upper area within the main valve chamber 49 is larger than the pressurized lower area circumscribed by the main valve seat 114.

When water level within the tank falls sufficiently, the pressure within the control chamber 52B falls and the pilot valve portion 53A of the diaphragm 53 moves away from the pilot valve seat 414. This reduces the pressure above the main valve member 51 in the main valve chamber 49 and the main valve member 51 opens with a radial peeling or rolling action away from the valve seat 114 and the valving surface 46. As a result, liquid flows from the inlet conduit 104 through the valve ports 47 to the central inward region 506 of the diffuser.

Within the diffuser, liquid flows through the four quadrants of the diffuser flow path among the baffle walls 516. Liquid reaching the outer periphery of the diffuser 500 merges at the two diffuser outlet ports 512 from which it flows upwardly into the vacuum breaker chamber 45 beneath the vacuum breaker valve member 50. Normally the valve member 50 lies loosely in the chamber approximately in the position illustrated in FIG. 4 so that the flow path through the head assembly 28 between the inlet and outlet conduits 104 and 106 is vented to atmosphere in the vacuum breaker chamber 45 by way of the cap vent ports 408 and body vent ports 128. When liquid flows through the fill valve 20, the force of liquid exiting from the diffuser outlet ports 512 drives the vacuum breaker valve member 50 upwardly toward the cap vent ports 408 permitting unrestricted flow through the vacuum breaker chamber 45. This flow reaches the outlet conduit 106 through the vacuum breaker outlet port 48. Port 48 is defined by the uppermost end of the outlet conduit 106, and this end includes a portion projecting slightly into the vacuum breaker chamber to hold part of the vacuum breaker valve member 50 slightly above the top wall 502 of the diffuser 500.

The flow leaving the vacuum breaker chamber 45 through the port 48 reaches the fill valve outlet port 210 by way of the outlet conduit 106 and the outlet section 208 of the riser 200. A part of this flow is diverted through a refill passage 130 (FIG. 8) extending from the outlet conduit 106. When fill valve 20 is used with a toilet water tank, the refill passage 130 communicates by means of a refill tube 55 with the toilet tank overflow pipe for refilling the toilet bowl and trap after each flushing operation.

In accordance with an important feature of the present invention, the opening and closing operations of the fill valve 20 are offset from one another relative to liquid level in the tank. This provides a latching or detenting operation preventing unstable opening and closing operation of the valve. This offset in operation is accomplished in a very reliable and simple, automatic manner by hydraulic loading of the diaphragm 53 when the main valve assembly 30 is open to refill the tank.

When liquid is flowing through the fill valve 20 in a tank filling operation, part of the flow is diverted to the lower, vent chamber 52A of the diaphragm cavity 52. One component of this diverted liquid flows through the notches 412 in the cap projection 410 and through the pilot valve seat 414 into the chamber 52A. To permit another component of diverted flow, the cap 400 includes downwardly extending projections 416 adjacent the vent ports 408 (FIGS. 4 and 11). The projections 416 prevent the vacuum breaker valve member 50 from closing entirely over the vent ports 408 so that a part of the liquid flowing through the vacuum breaker chamber 45 flows past the valve member 50 and into the diaphragm vent chamber 52A. Since the valve member 50 is formed of a flexible material, this flow component is automatically compensated and tends to remain constant despite variations in liquid inlet pressure. As pressure increases, the valve member 50 is forced more firmly over the vent ports 408. Conversely, if pressure is less, the valve member 50 automatically decreases the restriction to flow through the ports 408.

Diaphragm 53 is non-horizontal and the level of liquid within the chamber 52A during refill of the tank is controlled to provide a predetermined liquid pressure against the underside of the diaphragm. Moreover, after refilling of the tank, chamber 52A is emptied of liquid sufficiently so that liquid pressure against the diaphragm 53 is discontinued.

More specifically, liquid flows from the chamber 52A in two different ways. When the liquid flowing through the ports 408 and the pilot valve seat 414 reaches the level of the vent ports 128 in the body sidewall 122, the liquid overflows in a relatively unrestricted fashion out of the chamber 52A. Consequently, the elevation of the body vent ports 128 establishes an approximate predetermined maximum liquid level within the chamber 52A.

Liquid overflowing from the diaphragm vent chamber 52A through the ports 128 is returned quietly to the interior of the tank without undesirable splashing noise. This liquid descends to ledges 132 extending radially outwardly from the sidewall 122 of the body head portion 102. Liquid reaching this ledge flows downwardly along the ledge between the body sidewall 122 and the cover skirt wall 304 to a region above the standpipe 312 (see FIG. 6). At this region, the ledge 132 is not present and the liquid descends to a surface 316 defined in part by the standpipe 314 and in part by a projecting ledge 318. The surface 316 guides the overflowing liquid smoothly toward the inlet section 206 of the riser 200 along which the liquid flows in a nonturbulent fashion toward the bottom of the tank.

Liquid maintained at a predetermined level in chamber 52A by overflow through vent ports 128 immerses a predetermined part of the area of the bottom of diaphragm 53. This applies a predetermined force against the diaphragm tending to hold the diaphragm away from the pilot valve seat 414. As liquid level in the tank increases, pressurized air trapped within the control chamber 52B tends to move the diaphragm against the pilot valve seat 414. Liquid pressure in chamber 52A prevents the pilot valve seat 414 from being closed until the liquid reaches a level significantly higher than the level which would result in valve closure if liquid were not present in chamber 52A to hydraulically load the diaphragm 53.

When the pilot valve seat 414 is closed by the pilot valve portion 53A of the diaphragm, pressure increases within the main valve chamber 49 and firmly clamps the main valve member 51 closed over the valve seat 114 and against the annular array of main valve ports 47, thus terminating flow through the fill valve 20. After the valve is closed, liquid is permitted to flow from the vent chamber 52A to discontinue hydraulic loading of the diaphragm 53. As a result, the liquid level which results in opening of the pilot valve seat 414 is offset from and is lower than the liquid level which results in closing of the valve.

In order to empty the chamber 52A after a refilling operation of the fill valve 20, a restricted flow path from the chamber 52A is provided. Liquid in the chamber 52A can flow in a restricted fashion through a pair of small openings 134 provided in the lowermost region of chamber 52A (see FIGS. 10 and 13). Additional liquid may flow through clearances provided between the bayonet latch projections 404 of the cap 400 and the bayonet latch ledges 124 of the body 100. As a result of the restricted flow, liquid within the chamber 52A descends below the diaphragm 53 a short time after the valve is closed. In order effectively to achieve hydraulic loading of the diaphragm, the diverted flow into the chamber 52A should be greater than the restricted flow from chamber 52A and should be sufficient to cause a controlled overflow through the vent ports 128.

While the invention has been described with reference to details of the illustrated embodiment, it should be understood that such details are not intended to limit the scope of the invention as defined in the following claims.

What is claimed and desired to be secured by Letters Patent of the United States is:

1. A liquid level control valve for use with a liquid tank comprising in combination:
   an inlet conduit;
   a valve seat communicating with said inlet conduit;
   a main valve member movable to open and close said valve seat;
   means for controlling said valve member in response to the level of liquid in the tank;
   said controlling means including a cavity and a diaphragm dividing said cavity into a vent chamber and a control chamber means for pressurizing said control chamber in accordance with the level of liquid in the tank;
   an outlet flow path extending from said valve seat to the interior of said tank and including a vacuum breaker chamber;
   first port means in said vacuum breaker chamber communicating with said valve seat;
   second port means in said vacuum breaker chamber communicating with said vent chamber;
   third port means in said vacuum breaker chamber communicating downstream along said outlet flow path;
   a vacuum breaker valve in said vacuum breaker chamber overlying said first port means when said main valve member is in said closed position and overlying said second port means when said main valve member is in said open position; and a restricted flow path between said vacuum breaker chamber and said vent chamber for admitting liquid to said vent chamber when said main valve member is open to delay closing of said main valve member.

2. A liquid level control valve as claimed in claim 1 wherein said vacuum breaker chamber is generally annular with interfacing annular top and bottom walls, said first and second port means being located respectively in said bottom and top walls, and said vacuum breaker valve being an elastomeric washer-like body of generally uniform cross-section around its central axis.

3. A liquid level control valve as claimed in claim 1 wherein said diaphragm is nonhorizontal; and means including said restricted flow path for partly filling said vent chamber with liquid when said main valve member is in its open position.

4. A liquid level control valve as claimed in claim 3, said partly filling means including obstruction means in said vacuum breaker chamber for preventing said vacuum breaker valve from entirely closing said second port means.

5. A liquid level control valve as claimed in claim 4, said partly filling means further including first relatively unrestricted drain means spaced from the bottom of said vent chamber and second restricted drain means at the bottom of said vent chamber.

6. A liquid level control valve as claimed in claim 1, said pressurizing means including a stand pipe extending downwardly from said control chamber within said tank.

7. A valve for controlling the level of liquid in a tank or the like comprising:

an inlet and an outlet and a valve means for opening and closing communication between the inlet and the outlet;

value control means including a cavity;

a diaphragm mounted in said cavity dividing said cavity into a vent chamber and a control chamber;

said diaphragm being mounted in said cavity in a nonhorizontal position;

means for applying pressure in said control chamber in accordance with liquid level in the tank;

valve operating means for opening and closing said valve means in response respectively to expansion and contraction of said control chamber; and means for delaying expansion of said control chamber during filling of said tank;

said delaying means including means for partly filling said vent chamber with liquid when said valve means is open.

8. The valve of claim 7, said vent chamber including a restricted drain at the bottom of the vent chamber and a relatively unrestricted drain spaced from the bottom of the vent chamber; said partly filling means including a flow path extending from said valve means to said vent chamber; and restriction means in said flow path for admitting liquid into said vent chamber at a flow rate greater than the flow rate of said restricted drain.

9. The valve of claim 8 wherein said restriction means includes flow regulation means for decreasing the flow restriction in response to decreasing inlet liquid pressure.

10. The valve of claim 7, said pressure applying means including stand pipe means communicating with said control chamber and extending downwardly in said tank.

11. A method for controlling a tank filling valve comprising the steps of:

applying increasing pressure to a control chamber at a first side of a diaphragm as liquid level rises in the tank;

venting a vent chamber to atmosphere at the second side of the diaphragm;

closing the valve when the diaphragm moves away from the control chamber;

opening the valve when the diaphragm moves toward the control chamber; and delaying closing of the valve by applying a temporary loading pressure higher than atmospheric pressure against the second side of the diaphragm when the valve is open.

12. The method of claim 11 performed with a nonhorizontal diaphragm wherein said temporary loading pressure applying step includes the step of admitting liquid to the vent chamber at the second side of the diaphragm.

13. The method of claim 12 wherein said temporary loading pressure applying step includes the further steps of:

maintaining liquid level in the vent chamber at a predetermined level when the valve is open; and emptying liquid from the vent chamber when the valve is closed.

* * * * *